United States Patent
Baar et al.

(10) Patent No.: US 10,963,998 B1
(45) Date of Patent: Mar. 30, 2021

(54) ELECTRONIC DEVICES WITH DYNAMIC CONTROL OF STANDARD DYNAMIC RANGE AND HIGH DYNAMIC RANGE CONTENT

(71) Applicant: Apple Inc., Cupertino, CA (US)

(72) Inventors: Teun R. Baar, San Francisco, CA (US); Jiaying Wu, San Jose, CA (US); Nicolas P. Bonnier, Campbell, CA (US); Ramin Samadani, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/705,025

(22) Filed: Dec. 5, 2019

(30) Foreign Application Priority Data

Nov. 19, 2019 (CN) .......................... 201911134736.7

(51) Int. Cl.
*G06T 5/00* (2006.01)
*G06F 3/01* (2006.01)
*G06T 5/50* (2006.01)
*G06F 3/0481* (2013.01)
*G06F 3/0484* (2013.01)

(52) U.S. Cl.
CPC .............. *G06T 5/008* (2013.01); *G06F 3/013* (2013.01); *G06F 3/04812* (2013.01); *G06F 3/04847* (2013.01); *G06T 5/50* (2013.01); *G06T 2207/20208* (2013.01)

(58) Field of Classification Search
CPC . G06T 2207/20208; G06T 5/008; G06T 5/50; G06F 3/013; G06F 3/04847; G06F 3/04812; G06F 3/048
See application file for complete search history.

(56) References Cited

U.S. PATENT DOCUMENTS 7,742,032 B2 * 6/2010 Diefenbaugh ....... G09G 3/3406
345/102
8,225,229 B2 7/2012 Thorn et al.
(Continued)

FOREIGN PATENT DOCUMENTS

| CN | 101385071 A | 3/2009 |
| CN | 101536077 A | 9/2009 |

(Continued)

*Primary Examiner* — Edward Martello
(74) *Attorney, Agent, or Firm* — Treyz Law Group, P.C.; Joseph F. Guihan

(57) ABSTRACT

An electronic device may be provided with a display. Standard and high dynamic range content may be produced by content generators operating on control circuitry. Standard dynamic range content and high dynamic range content may be simultaneously displayed. Tone mapping parameters may be produced by a tone mapping engine for use in displaying the standard and high dynamic range content. The tone mapping parameters may be selected based on factors such as ambient light level, user brightness setting, content statistics, display characteristics, point of gaze information, power consumption information, and per-window information. Tone mapping parameters may be selected to accommodate simultaneous display of standard and high dynamic range content. Tone mapping parameters may be temporarily modified in response to a user's point of gaze switching between standard dynamic range content and high dynamic range content.

20 Claims, 11 Drawing Sheets

(56) References Cited

U.S. PATENT DOCUMENTS

| | | | |
|---|---|---|---|
| 8,752,963 B2 | 6/2014 | McCulloch et al. | |
| 10,063,828 B2 | 8/2018 | Toma et al. | |
| 10,089,960 B2 | 10/2018 | Greenebaum et al. | |
| 10,249,263 B2 | 4/2019 | Hendry et al. | |
| 10,403,214 B2* | 9/2019 | Baar | G09G 3/3406 |
| 2004/0165086 A1* | 8/2004 | Spitzer | G06T 5/20 |
| | | | 348/239 |
| 2006/0092182 A1* | 5/2006 | Diefenbaugh | G06F 1/3218 |
| | | | 345/690 |
| 2015/0143091 A1* | 5/2015 | Brace | G06F 9/455 |
| | | | 713/1 |
| 2015/0325008 A1* | 11/2015 | Scarff | G06T 11/001 |
| | | | 345/605 |
| 2015/0339811 A1* | 11/2015 | Zhong | G06T 7/0002 |
| | | | 382/104 |
| 2016/0180801 A1 | 6/2016 | Lee et al. | |
| 2018/0330674 A1 | 11/2018 | Baar et al. | |
| 2019/0043177 A1* | 2/2019 | Nishimura | G06T 5/007 |
| 2019/0122637 A1 | 4/2019 | Sanders et al. | |
| 2019/0370946 A1* | 12/2019 | Samadani | H04N 5/2355 |
| 2020/0074941 A1* | 3/2020 | Takahashi | G09G 3/342 |

FOREIGN PATENT DOCUMENTS

| | | |
|---|---|---|
| CN | 102726036 A | 10/2012 |
| CN | 107945766 A | 4/2018 |
| CN | 110032271 A | 7/2019 |
| CN | 110036436 A | 7/2019 |
| CN | 110214349 A | 9/2019 |
| JP | 2015222316 A | 12/2015 |
| TW | 201826250 A | 7/2018 |

\* cited by examiner

ELECTRONIC DEVICES WITH DYNAMIC CONTROL OF STANDARD DYNAMIC RANGE AND HIGH DYNAMIC RANGE CONTENT

This application claims priority to CN patent application No. 201911134736.7, filed on Nov. 19, 2019, which is hereby incorporated by reference herein in its entirety.

BACKGROUND

This relates generally to electronic devices, and, more particularly, to electronic devices with displays.

Electronic devices often include displays. If care is not taken, displays may be damaged by displaying bright content for prolonged periods of time, displays may be operated with brightness levels that consume excessive power, user preferences may not be taken into account when adjusting display brightness, and displayed content may exhibit visible artifacts. Addressing these concerns while displaying content with a pleasing appearance is challenging.

SUMMARY

An electronic device may be provided with a display. Content generators on the electronic device may provide content to be displayed on the display. Control circuitry in the electronic device may be used in implementing a tone mapping engine. The tone mapping engine may select a content-luminance-to-display luminance mapping to be used in displaying content on the display from a content generator. A content-luminance-to-display-luminance mapping may be characterized by tone mapping parameters such as a black level, a reference white level, a specular white level, skin tone level, and the slope or the gamma of the mapping.

Standard and high dynamic range content may be produced by standard and high dynamic range content generators running on the control circuitry. In some cases, standard dynamic range content and high dynamic range content are simultaneously displayed. The tone mapping engine may select tone mappings (content-luminance-to-display-luminance mappings) and associated tone mapping parameters for use in displaying the standard and high dynamic range content. The tone mapping parameters may be selected based on factors such as ambient light level, user brightness setting, content statistics, display characteristics, point of gaze information, power source and consumption information, and per-window information.

Point of gaze information may be gathered using a gaze-tracker. Additional point of gaze information may include information regarding an active window on the display and information regarding the location of a cursor on the display. The point of gaze information may be used to determine whether the viewer is looking at the high dynamic range content or the standard dynamic range content.

To account for brightness differences between the high dynamic range content and the standard dynamic range content, tone mapping parameters may be adjusted dynamically to accommodate a viewer's point of gaze switching between the high dynamic range content and the standard dynamic range content. A tone mapping parameter such as maximum display brightness may be initially increased (or decreased) and then gradually returned to its original magnitude in one example.

DETAILED DESCRIPTION

Figure 1:
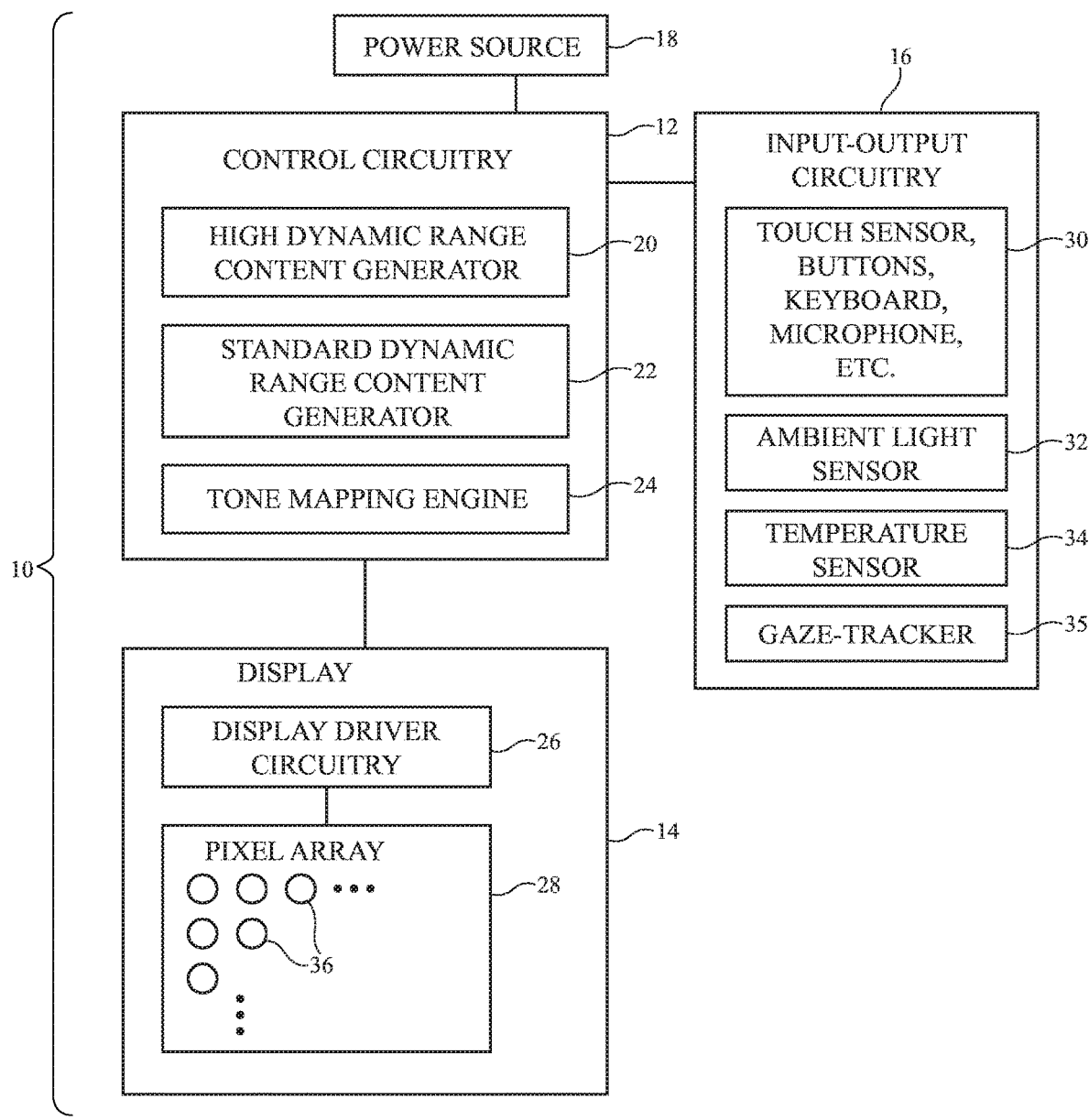
FIG. 1 is a schematic diagram of an illustrative electronic device having a display in accordance with an embodiment.

An illustrative electronic device of the type that may be provided with a display is shown in FIG. 1. As shown in FIG. 1, electronic device 10 may have control circuitry 12. Control circuitry 12 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application-specific integrated circuits, graphics processing units, display driver circuitry such as timing controller integrated circuits and other display driver integrated circuits, and other control circuitry.

Control circuitry 12 is configured to execute instructions for implementing desired control and communications features in device 10. For example, control circuitry 12 may be used in determining pixel luminance levels that are to be used in displaying content for a user. Pixel luminance levels may be based, for example, on ambient light conditions, user-adjusted display brightness settings, statistical information associated with content that is being displayed, display characteristics, information regarding a viewer's direction of view (e.g., from a gaze-tracking system), etc. Control circuitry 12 may be configured to perform these operations using hardware (e.g., dedicated hardware such as integrated circuits and thin-film circuits) and/or software (e.g., code that runs on control circuitry 12). Software code for performing control and communications operations for device 10 may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 12 during operation of device 10.

Input-output circuitry 16 in device 10 may be used to allow data to be supplied to device 10 from a user or external equipment, may be used to gather environmental data, and may be used to supply data to external equipment and output for a user. Input-output circuitry 16 may include input-output devices 30 such as buttons, joysticks, scrolling wheels, touch pads, key pads, keyboards, microphones, speakers, tone generators, vibrators, cameras, sensors, light-emitting diodes and other status indicators, touch sensitive displays (e.g., touch sensors overlapping pixel arrays in displays), data ports, etc. As shown in FIG. 1, input-output circuitry 16 may include a color ambient light sensor or other ambient light sensor 32 for gathering ambient light measurements (e.g., ambient light levels such as ambient light luminance measurements and/or ambient light color measurements such as color temperature measurements and/or color coordinate measurements). Input-output circuitry 16 may also include temperature sensor circuitry such as one or more temperature sensors. Temperature sensors such as temperature sensor 34 may be used to gather real time information on the operating temperature of device 10 and display(s) associated with device 10.

Input-output circuitry 16 may also include a gaze-tracker such as gaze-tracker 35 (sometimes referred to as a gaze-tracking system or a gaze-tracking camera). Gaze-tracker 35 may include a camera and/or other gaze-tracking system components (e.g., light sources that emit beams of light so that reflections of the beams from a user's eyes may be detected) to monitor the user's eyes. Gaze-tracker(s) 35 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or may be used to determine other gaze information. Cameras in the gaze-tracking system may sometimes be referred to as gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze. The use of a gaze-detection camera in gaze-tracker 35 is merely illustrative. Gaze-tracker 35 may ultimately determine a user's point of gaze (sometimes referred to as direction of view, viewing area, focus point, etc.).

Power may be supplied to control circuitry 12 and other resources in device 10 using one or more power sources such as power source 18. Power source 18 may be an alternating-current (AC) source such as a wall outlet (mains supply) and/or a direct-current (DC) source such as a battery. During operation, control circuitry 12 can detect whether power is being received from an AC or DC source and can monitor the charge state of the battery.

Device 10 may include one or more internal and/or one or more external displays such as illustrative display 14. Display 14 may be mounted in a common housing with device 10 (e.g., when device 10 is a mobile device such as a cellular telephone, wristwatch device, tablet computer, or laptop computer or when device 10 is an all-in-one device such as a television or desktop computer). In other configurations, display 14 may be coupled to device 10 wirelessly or with a cable (e.g., when device 10 is a desktop computer or a set-top box).

In general, device 10 may be any suitable type of device. Device 10 may, for example, be a computing device laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a virtual reality device, an augmented reality device, a navigation device, an embedded system such as a system in which electronic equipment with a display is mounted in a kiosk or automobile, equipment that implements the functionality of two or more of these devices, or other electronic equipment. Device 10 (e.g., a portable device) may be exposed to a variety of environmental conditions. For example, ambient light levels and therefore display glare may vary as a portable device is moved between indoors and outdoors environments (as an example).

Electronic device 10 may have a housing. The housing, which may sometimes be referred to as an enclosure or case, may be formed of plastic, glass, ceramics, fiber composites, metal (e.g., stainless steel, aluminum, etc.), other suitable materials, or a combination of any two or more of these materials. The housing may be formed using a unibody configuration in which some or all of the housing is machined or molded as a single structure or may be formed using multiple structures (e.g., an internal frame structure, one or more structures that form exterior housing surfaces, etc.). In laptop computers and other foldable devices, a first portion of the housing may rotate relative to a second portion of the housing (e.g., a display housing in a laptop computer may rotated about a hinge axis relative to a base housing in the laptop computer).

Display 14 may be mounted in the housing. Display 14 may have a rectangular outline and be surrounded by four peripheral edges, may have a shape that is circular or oval, or may have other suitable outlines. Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may have an array 28 of pixels 36 for displaying images for a user (e.g., video, graphics, text, etc.). Display driver circuitry 26 (e.g., thin-film transistor circuitry on display 14 and/or one or more timing-controller integrated circuits and/or other display driver integrated circuits) may be used to display images on pixel array 28. Pixel array 28 may include, for example, hundreds or thousands of rows and hundreds or thousands of columns of pixels 36. To display color images, each pixel 36 may include subpixels of different colors. For example, each pixel 36 may include, red, green, and blue subpixels or subpixels of different colors. By varying the relative intensity of light emitted by each subpixel in a pixel, pixel output color can be adjusted. The color cast (white point) of each pixel can be adjusted by modifying the gain associated with each subpixel.

The pixel array of display 14 may be formed from liquid crystal display (LCD) components, an array of electrophoretic display pixels, an array of plasma display pixels, an array of organic light-emitting diode pixels or other light-emitting diodes, an array of electrowetting display pixels, or pixels based on other display technologies. Display 14 may be backlit with an array of locally dimmable light-emitting diodes or other suitable backlight structures. Display 14 may display images with a standard dynamic range (e.g., images that exhibit a contrast ratio of about 1,000:1 between their brightest and darkest pixel luminance values) and/or may display images with a high dynamic range (e.g., images that exhibit a contrast ratio of about 20,000:1 or more between their brightest and darkest luminance values). As another example, standard dynamic range content may have a contrast ratio of less than 10,000:1, less than 20,000:1, etc. High dynamic range content may have a contrast ratio of greater than 20,000:1, greater than 25,000:1, etc.

During operation, content generators in device 10 (e.g., operating system functions and/or applications running on control circuitry 12) may generate content for display on the pixel array of display 14. As an example, electronic device 10 may include one or more standard dynamic range (SDR) content generators and/or more high dynamic range (HDR) content generators (e.g., content generators that generate high dynamic range content in accordance with one or more different high dynamic range standards such as the HDR10 Media Profile standard, sometimes referred to as HDR10 and the Hybrid Log-Gamma standard, sometimes referred to as HLG). A luminance value mapping engine such as tone mapping engine 24 may be used to provide content generators with tone mapping parameters (sometimes referred to as luminance value mapping parameters) indicating how the content generators should map content luminance values to display luminance values and/or may be used to directly perform content-luminance-to-display-luminance mapping operations on content luminance values from the content generators. For example, tone mapping engine 24 may supply content generators with tone mapping parameters such as a black level, reference white level, specular white level, skin tone level, and/or gamma and/or slope values to use in producing display luminance values for use in displaying images with pixels 36. Tone mapping engine 24 may be implemented using code running on control circuitry 12 of FIG. 1, control circuitry for device 10 such as display driver circuitry 26, and/or other control circuitry and/or may use hardwired features of the control circuitry in device 10.

Standard dynamic range content is often encoded in grey levels (e.g., 0-255 bits), where 0 corresponds to dark black and 255 corresponds to bright white. High dynamic range content may be encoded in luminance levels for each pixel (generally to be displayed for standard viewing conditions such as dim viewing conditions) or may be encoded in grey levels having a high bit depth. Device 10 may experience changes in ambient lighting conditions, user brightness settings may be adjusted up and down by a user, the content being displayed on display 14 may exhibit changes such as changes in average pixel luminance, and burn-in risk, and other conditions related to the presentation of content on display 10 may change over time. Additionally, a user's point of gaze may switch between standard dynamic range content and high dynamic range content. Device 10 may use tone mapping engine 24 to ensure that content is rendered appropriately for displaying on display 14 in view of these potentially changing conditions and other criteria such as the characteristics of display 14.

Figure 2:
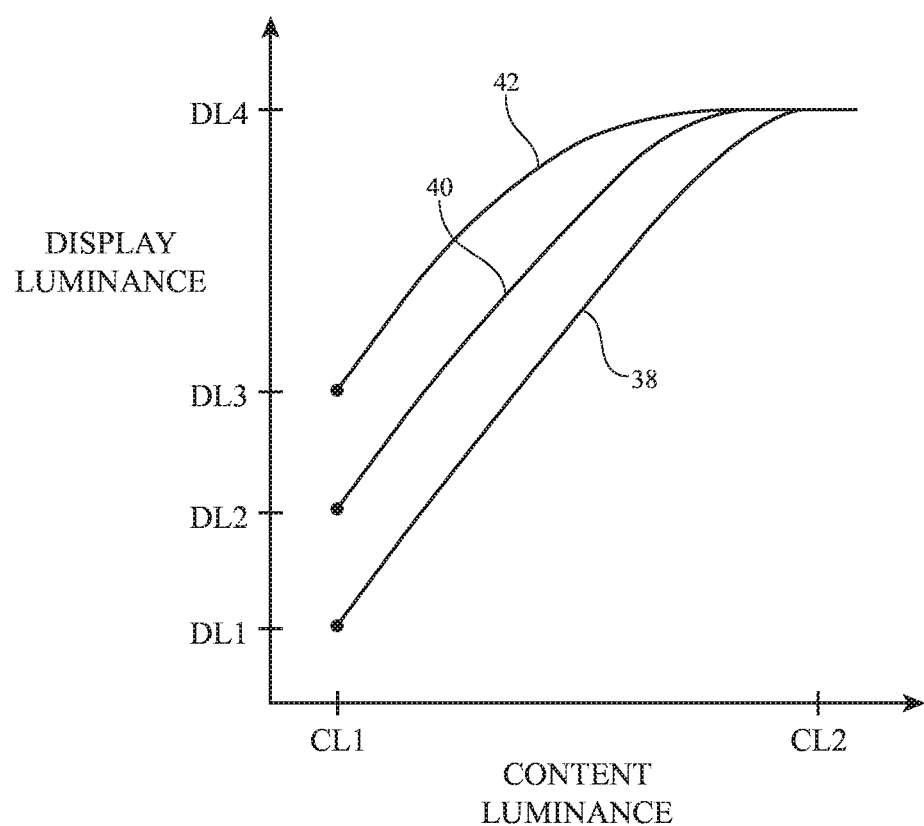
FIG. 2 is a graph showing how content luminance may be mapped to display luminance over a variety of user brightness settings in accordance with an embodiment.

FIG. 2 is a graph showing how content luminance may be mapped to display luminance. In the example of FIG. 2, a user is adjusting a display brightness setting for display 14 between three different levels (dim, moderate, and bright display brightness settings, respectively). A user may supply device 10 with a desired brightness setting (user-selected brightness level) by adjusting a touch screen display slider (e.g., a slider displayed on display 14) or using a button or other input-output device in circuitry 16. When a dim brightness setting level is selected, display 14 displays content in accordance with curve 38. When a moderate brightness setting level is selected, display 14 displays content in accordance with curve 40. The output of display 14 follows curve 42 in response to selection of a high brightness setting.

In each of these curves, low content luminance values are associated with black and high content luminance values are associated with white. At a given black content luminance level, curve 38 is associated with a display pixel luminance value of DL1 visible to the user for a content luminance value of CL1, curve 40 is associated with a display pixel luminance value of DL2 for content luminance CL1, and curve 42 is associated with a display pixel luminance value DL3 for content luminance CL1. The luminance level DL2 is brighter than luminance level DL1, because curve 40 is associated with a brighter set of output luminances from pixels 36 than curve 38. Similarly, luminance level DL3 is brighter than luminance level DL2 because curve 42 is associated with a brighter set of output luminances from pixels 36 than curve 40. White image pixels (e.g., pixels at content luminance level CL2) are all associated with the same display luminance level DL4 (e.g., the brightest output available from pixels 36 in display 14), so the mappings of curves 38, 40, and 42 will all produce a display luminance of DL4 for a content luminance of CL2.

Figure 3:
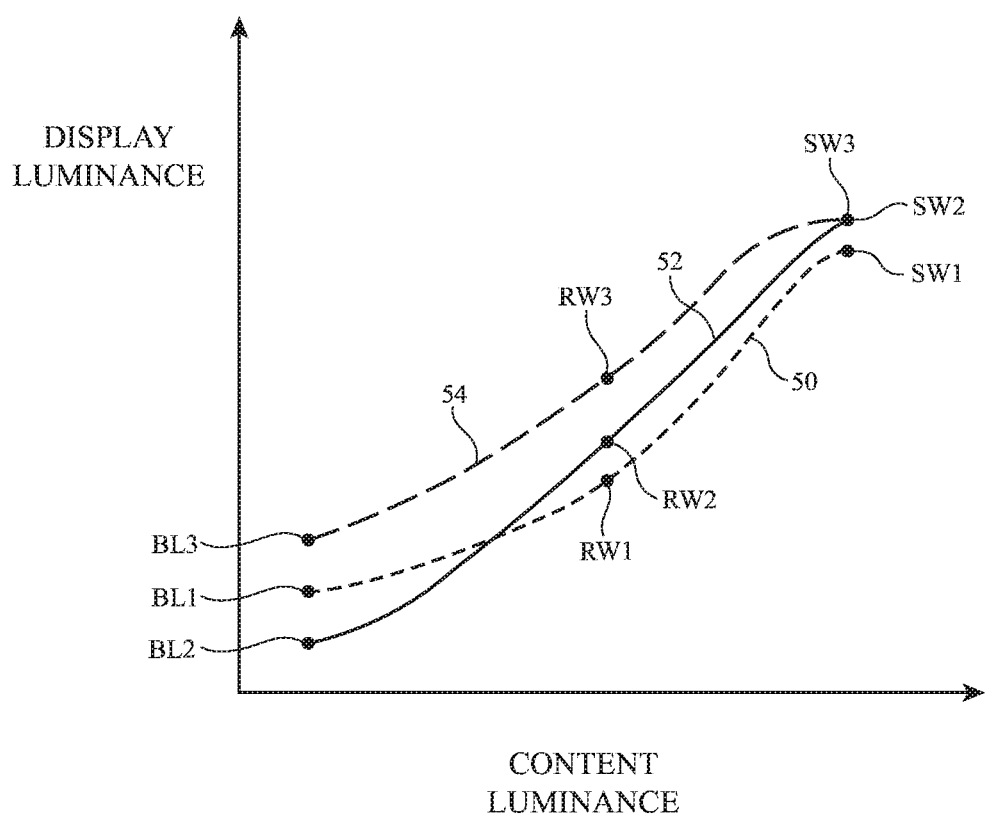
FIG. 3 is a graph showing how content-luminance-to-display-luminance relationships may be characterized by a black level, reference white level, and specular white level in accordance with an embodiment.

Tone mapping engine 24 may use tone mapping parameters to define content-luminance-to-display-luminance maps (sometimes referred to as tone maps, tone curves, content-luminance-to-display-luminance curves, mapping curves, etc.). FIG. 3 is a graph showing how content luminance values may be mapped to display luminance values in device 10 in accordance with content-luminance-to-display-luminance mapping curves. As shown in FIG. 3 tone mapping parameters (sometimes referred to as tone parameters, tone map parameters, map parameters, mapping parameters, etc.) may be used to define the tone maps.

In the example of FIG. 3, there are three illustrative mapping curves: curve 50, curve 52, and curve 54. Each of these curves may be identified using a set of tone mapping parameters such as a black level (BL), reference white level (RW), and specular white level (SW). During operation, engine 24 may supply content generators such as content generators 20 and/or 22 with suitable values of these tone mapping parameters, thereby informing content generators 20 and/or 22 whether to use curve 50, curve 52, or curve 54.

If, for example, engine 24 supplies a content generator with tone mapping parameters BL1, RW1, and SW1, the content generator can generate display luminance values from content luminance values following curve 50. If, engine 24 supplies the content generator with tone mapping parameters BL2, RW2, and SW2, the content generator can generate display luminance values from content luminance values following curve 52. The content generator can generate display luminance values from content luminance values following curve 54 in response to tone mapping parameters BL3, RW3, and SW3 from engine 24. In this way, a set of tone mapping parameters (e.g., three or more tone-mapping parameters, 3-10 tone-mapping parameters, fewer than 5 tone-mapping parameters, etc.) can be used by engine 24 to specify a desired tone mapping relationship for the content generator to follow depending on current operating conditions. If a skin tone mapping parameter is used, its value may, as an example, lie between the reference white level and specular white level or between the reference white level and the black level and may represent skin tones common to human skin. Gamma and/or curve slope values may also be used as tone mapping parameters that specify a content-luminance-to-output-luminance mapping curve.

Figure 4:
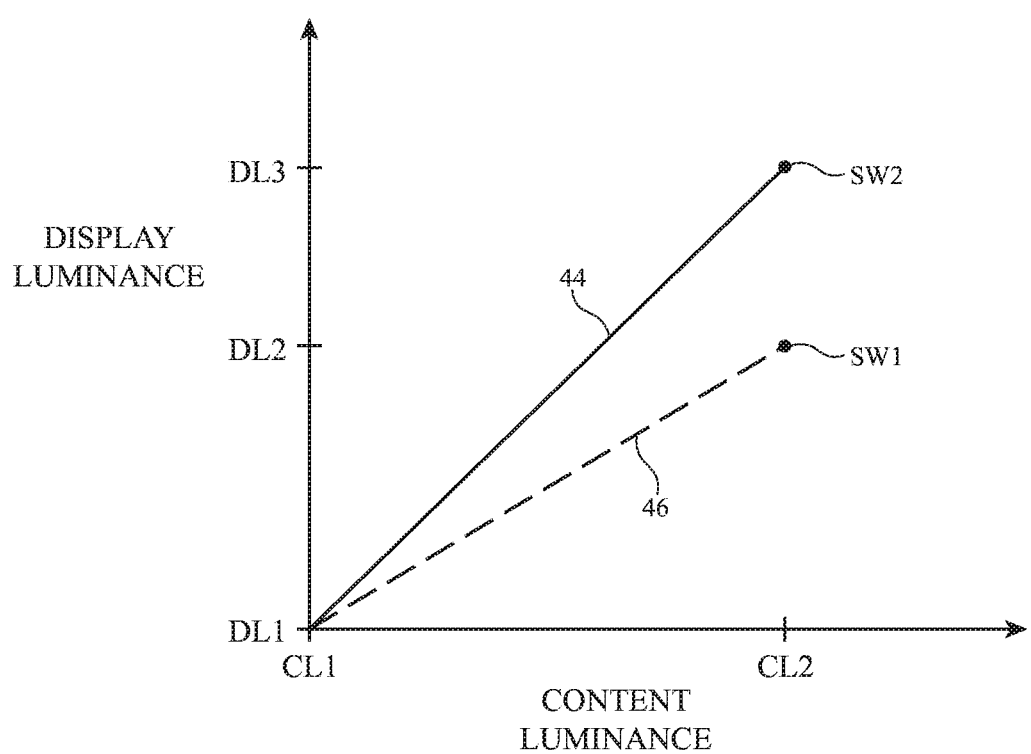
FIG. 4 is a graph showing how linear content-luminance-to-display-luminance relationships may be used for standard dynamic range content in accordance with an embodiment.

The example of the tone maps of FIG. 3 having curved shapes is merely illustrative. If desired, the tone maps may instead be linear. FIG. 4 is a graph of illustrative linear tone maps that may be used for content such as standard dynamic range content. In each of these tone maps, low content luminance values are associated with black and high content luminance values are associated with white. At a given black content luminance level (e.g., CL1), tone map 46 is associated with a display pixel luminance value of DL1 and tone map 44 is associated with a display pixel luminance value of DL1. At white content luminance levels (e.g., CL2), tone map 46 is associated with a display pixel luminance value of DL2 and tone map 44 is associated with a display pixel luminance value of DL3. The luminance level DL3 is brighter than luminance level DL2 because tone map 44 is associated with a brighter set of output luminances from pixels 36 than tone map 46. Tone map 46 has an associated specular white level SW1 whereas tone map 44 has an associated specular white level SW2.

In FIG. 4, the tone maps are both linear and the black display luminance level is fixed (e.g., at 0). However, the maximum display luminance of each tone map may be varied based on ambient lighting conditions, user brightness settings, and/or other desired parameters. In general, linear tone maps of the type shown in FIG. 4 may be associated with standard dynamic range (SDR) content. Curved tone maps of the type shown in FIGS. 2 and 3 may be associated with high dynamic range content. In general, high dynamic range content may have a higher maximum display brightness (e.g., a higher specular white level) than standard dynamic range content.

The tone maps of FIGS. 2-5 have been described in relation to luminance. It should be noted that, after using tone mapping for luminance selection, color correction may be performed to ensure that color is preserved after tone mapping.

Figure 5:
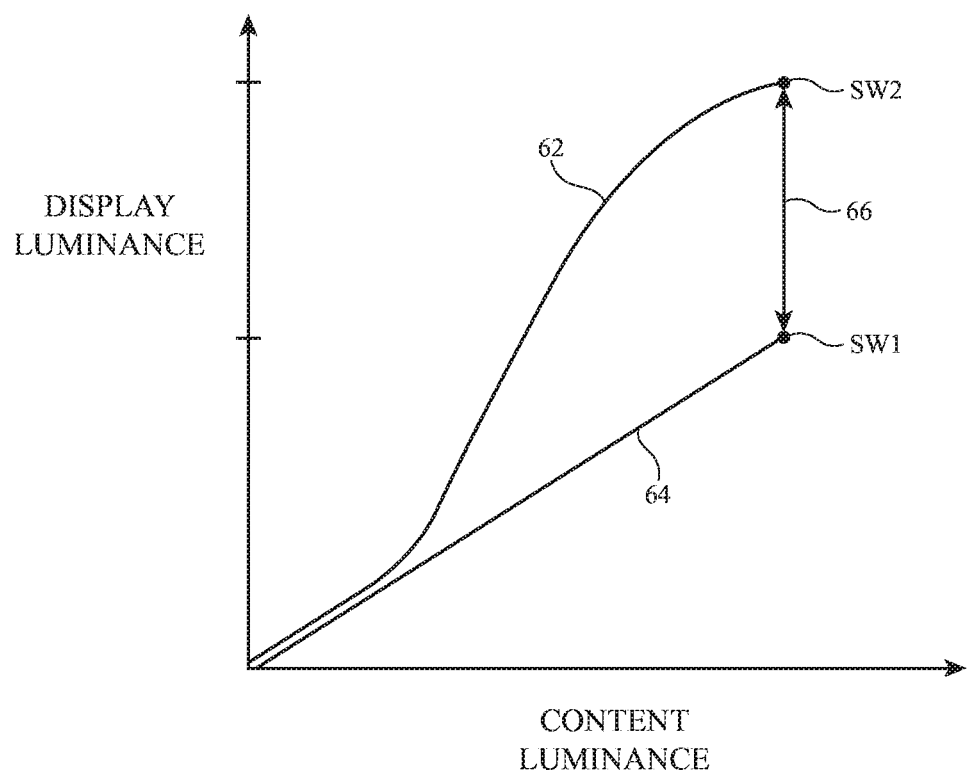
FIG. 5 is a graph showing how high dynamic range content may have a higher maximum display brightness than standard dynamic range content in accordance with an embodiment.

FIG. 5 is a graph showing content-luminance-to-display-luminance mapping curves for both standard dynamic range content and high dynamic range content. In particular, tone map 62 may be used for high dynamic range content whereas tone map 64 may be used for standard dynamic range content. As shown, tone map 62 has an associated maximum display brightness level (e.g., a specular white level) SW2 whereas tone map 64 has an associated maximum display brightness level (e.g., a specular white level) SW1. The maximum brightness of HDR tone map 62 may exceed the maximum brightness of SDR tone map 64 by amount 66. The amount 66 that the maximum HDR brightness exceeds the maximum SDR brightness may sometimes be referred to as headroom. Headroom may be represented in terms of absolute brightness difference or as a ratio. For example, consider a scenario in which SW1 is 100 nits and SW2 is 300 nits. The headroom may be considered 200 nits (since SW2 is 200 nits higher than SW1). Alternatively, the headroom may be considered 3 (since SW2/SW1=3).

The tone-mapping parameters and corresponding tone maps used to define the relationship between content luminance and display luminance may be adjusted based on a variety of factors. Tone mapping engine 24 can select a desired tone mapping curve based on operating conditions such as display brightness settings (e.g., user defined brightness settings and brightness levels set by device 10 to accommodate a normal power operating mode and a low-power operating mode), ambient conditions (ambient light level and ambient light color), content statistics (e.g., information on average pixel luminance and burn-in risk or other information on operating conditions having a potential impact on display lifetime, quality information, dynamic range information etc.), display characteristics (e.g., display limitations such as maximum achievable pixel luminance), power constraints (e.g., due to thermal limitations and/or other considerations), whether device 10 is operating on DC power (power from the battery in source 18 of device 10) or AC power, etc. Additionally, tone mapping engine 24 can select a desired tone mapping curve based on a viewer's point of gaze. This may be particularly useful in situations when both standard dynamic range content and high dynamic range content are displayed simultaneously.

Figure 6A:
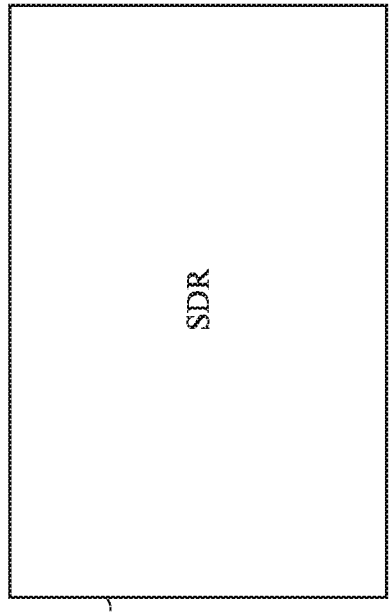
FIGS. 6A-6C are top views of illustrative displays showing how only standard dynamic range content, only high dynamic range content, or both standard dynamic range content and high dynamic range content may be displayed in accordance with an embodiment.

In some situations, as shown in FIG. 6A, only standard dynamic range content from standard dynamic range content generator 22 is displayed on display 14. Standard dynamic range content generator 22 may be associated with displaying standard video and images, on-screen menus, pop-up boxes, selectable on-screen buttons, text documents, standard dynamic range graphics, content associated with a passthrough camera (e.g., a camera that captures images of the real world) and other standard dynamic range content. In these situations, a tone mapping may be selected so that the standard dynamic range content is displayed satisfactorily on display 14. As an example, the standard dynamic range content may be displayed with a maximum luminance (SW level) that is lower than the maximum possible pixel luminance supported by the hardware of display 14. This approach may help conserve power while displaying the content for a user.

Figure 6B:
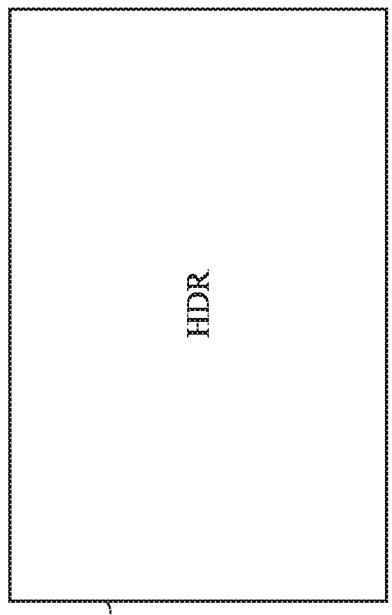

In other situations, as shown in FIG. 6B, only high dynamic range content from high dynamic range content generator 20 is displayed on display 14. The high dynamic range content supplied by high dynamic range content generator 20 has a higher dynamic range than the standard dynamic range content from standard dynamic range content generator 22. To take advantage of the larger dynamic range associated with the content from content generator 20 (e.g., to ensure that specular highlights are sufficiently bright for a viewer), a tone mapping may be selected that allows the brightest pixels in the high dynamic range content to be displayed with elevated luminance levels relative to the brightest pixels in the standard dynamic range content.

Figure 6C:
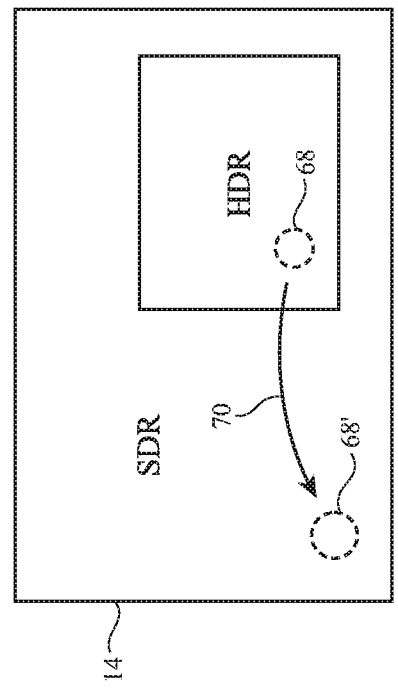

It is sometimes desirable to display content that has one or more areas of standard dynamic range content and one or more areas of high dynamic range content. For example, as shown in FIG. 6C, a high dynamic range window may be displayed on standard dynamic range background content. The background content may, for example, extend across all of display 14. The high dynamic range content may partly cover the background content. As an example, the high dynamic range content may be displayed in a rectangular area (e.g., a window) that overlaps some of the background area while allowing other portions of the background area to be viewed by a user.

When both high dynamic range content and standard dynamic range content are displayed simultaneously, as in FIG. 6C, the brightness disparity between the HDR content and the SDR content may become perceptible to the user. Consider the aforementioned example where the HDR content has a maximum brightness that is 3 times brighter than the maximum brightness of the SDR content. If the user's point of gaze is directed to the HDR content (e.g., to area 68), the user's eyes may adapt to the high brightness of the HDR content. Then, if the user's point of gaze shifts to the SDR content (e.g., to area 68' as indicated by arrow 70), the SDR content may appear noticeably dim.

Consider another example in which the user's point of gaze is directed towards the SDR content. The user's eyes may be, accordingly, adapted to the relatively low brightness of the SDR content. Then, if the user's point of gaze shifts from the SDR content to the HDR content (which has a much higher maximum brightness), the HDR content may appear noticeably or uncomfortably bright.

Therefore, point of gaze information may be used to dynamically modify the brightness of the HDR content and/or the SDR content to smooth the transition for the viewer when the viewer's point of gaze switches between the HDR and SDR content. For example, when a viewer switches point of gaze from HDR content to dimmer SDR content, the SDR content may be made brighter as the user's eye transitions from the HDR content to the SDR content. Similarly, when a viewer switches point of gaze from SDR content to brighter HDR content, the HDR content may be made dimmer as the user's eye transitions from the SDR content to the HDR content.

Figure 7:
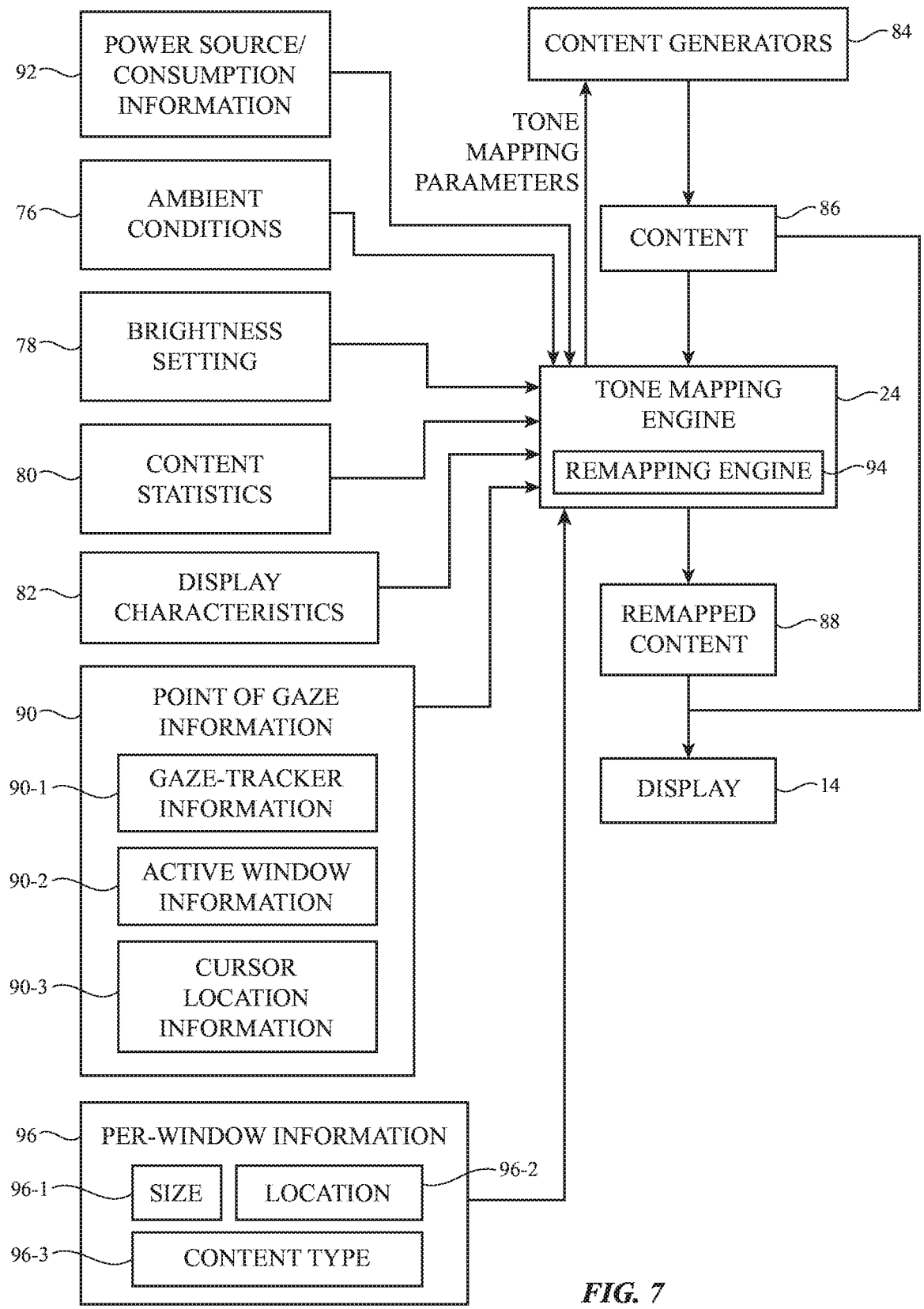
FIG. 7 is a diagram showing how a tone mapping engine can be used in implementing content-luminance-to-display-luminance mappings in accordance with an embodiment.

FIG. 7 is a diagram showing how tone mapping engine 24 may receive input such as ambient conditions 76, brightness setting information 78, content statistics 80, display characteristics 82, point of gaze information 90, power source and consumption information 92, and per-window information 96.

Ambient conditions 76 may include a current ambient light level measured with ambient light sensor 32 and/or a current ambient color (e.g., a color temperature, set of color coordinates, etc.) measured with ambient light sensor 32. As environmental brightness increases, display brightness can be increased to compensate for screen glare. As environmental color shifts (e.g., as a user moves device 10 from a warm indoor lighting environment to a cold outdoor lighting environment), the white point (color cast) of display 14 can be cooled accordingly to avoid undesired color cast effects in displayed images. Ambient conditions 76 may also be measured by a camera of device 10 such as a passthrough camera (e.g., in input-output circuitry 16 in FIG. 1). For example, in a head-mounted virtual reality display, a pass-through camera may capture images of the real world around the user and the images may be displayed on the virtual reality display. Information from the passthrough camera may be used to determine the ambient conditions 76.

Brightness settings information 78 may include a user-selected brightness level. User brightness settings may be adjusted based on user input from a user on a touch screen, based on user keyboard input, and/or based on other user input. When a low brightness setting level is selected, display 14 displays content that is less bright. When a high brightness setting level is selected, display 14 displays content that is more bright.

Content statistics 80 may be gathered by analyzing frames of image data produced by content generator(s) 84 that are being displayed on display 14 or may be provided in the form of metadata (e.g., content category information such as, for example, "movie" or "live sports"). Control circuitry 12 (e.g., a microprocessor, display driver integrated circuits, graphics processing unit circuitry, and/or other control circuitry in device 10) may, for example, maintain running averages of image luminance values (e.g., a running average pixel luminance value for images being displayed on display 14 over multiple image frames) and/or may maintain historical luminance information in a more granular fashion (e.g., on blocks of one or more pixels within pixel array 28) to quantify burn-in risk for each of these blocks. Other content statistics such as information on content quality such as bit depth, dynamic range of image input data (e.g., minimum, mean, and maximum value), compression type and amount, data rate, noise level, metadata-specified quality factors, and other content quality metrics can also be gathered and provided to tone mapping engine 24.

Display characteristics 82 may also be used by tone mapping engine 24. Display characteristics 82 may include information on physical display limitations for display 14. For example, display characteristics 82 may include information on the characteristics of pixel array 28 and display 14 (e.g., maximum achievable specular white level, display resolution, contrast ratio, bit depth, etc.). These display characteristics may be stored in control circuitry 12 during manufacturing (e.g., when display 14 is built into device 10) and/or may be obtained from display 14 when display 14 is coupled to device 10 (e.g., when display 14 is a stand-alone display). A user may also supply control circuitry 12 with display characteristics information (e.g., by entering this information using a keyboard or other input-output device). In some configurations, display characteristics may be set by default and/or retrieved from a database of display characteristics maintained in device 10 (e.g., a database of stand-alone display models).

Point of gaze information 90 may also be used by tone mapping engine 24. Tone mapping engine 24 may factor in the point of gaze when generating tone parameters and/or when remapping engine 94 dynamically changes one or more tone parameters and remaps content based on a change in the user's point of gaze.

Point of gaze information may include a variety of information that is used to identify a point of gaze of the viewer of the display. For example, gaze-tracker information 90-1 from a gaze-tracker such as gaze-tracker 35 in FIG. 1 may identify a viewer's current point of gaze. In some electronic devices, the gaze-tracker may actively measure with high precision the point of gaze of a viewer. In these cases, the point of gaze is therefore known with relatively high confidence and additional information may not be required to determine a user's point of gaze. However, in some cases the gaze-tracker may have a low resolution or the gaze-tracker may be omitted entirely from electronic device 10. In these situations, one or more pieces of additional information may be used (optionally in combination with gaze-tracker data) to predict a user's point of gaze.

Active window information 90-2 may include information on which window (e.g., a dedicated viewing area associated with a particular application or type of content) on display 14 is actively being used by the user of the electronic device. During use of the electronic device, the user may have multiple windows with varying types of content open at the same time (e.g., one or more windows with SDR content and/or one or more windows with HDR content). The active window may be the most recently selected window, the largest window, etc. For example, consider the example of FIG. 6C with an HDR window on a SDR background. If the HDR window is the window most recently selected by the user (e.g., clicked on the with a mouse or trackpad), the HDR window may be considered the active window.

Cursor location information 90-3 may also be used to determine the point of gaze of the user. A user may commonly have a point of gaze that overlaps the location of the cursor (e.g., a cursor moved by the user with a mouse or trackpad). There may be a particularly high correlation between cursor location and point of gaze when the user makes a selection (e.g., clicks) using the cursor. In other words, a user is highly likely to be looking at the cursor when using the cursor to make a selection on the display. Therefore, the cursor location information may be useful in determining a user's likely point of gaze.

Additional information may be used to help determine a user's point of gaze. For example, if a user is actively typing on a keyboard, it is likely that the point of gaze is directed towards the text being typed. Keyboard information may therefore be used to determine a user's point of gaze. If display 14 is touch-sensitive and a user touches a particular location on the screen, it may be likely that the user's point of gaze is directed towards that location. In general, any information from the input-output circuitry (e.g., sensors, buttons, keyboard, etc.) within the electronic device may be used as point of gaze information 90.

Power source and consumption information 92 may also be used by tone mapping engine 24. Power-consumption-based brightness level adjustments may be made by control circuitry 12 to help extend battery life. For example, control circuitry 12 may lower the brightness level for display 14 when device 10 enters a low power mode due to thermal conditions such as in response to detection that a temperature level measured with sensor 34 has exceeded a predetermined level, due to detection of a low battery level measured with control circuitry 12, based on detection that a user has placed device 10 in a low power mode to extend battery life, etc. In low power mode, control circuitry 12 may lower the current display brightness setting, may impose a cap on the brightness level, and/or may reduce the luminance of specular highlights or may make other adjustments that help reduce the power consumption of display. In addition to the state of charge of the battery of the electronic device, the power source and consumption information 92 may include information on whether the electronic device is using an alternating-current (AC) power source such as a wall outlet (mains supply) and/or direct-current (DC) power source such as the battery.

Figure 8:
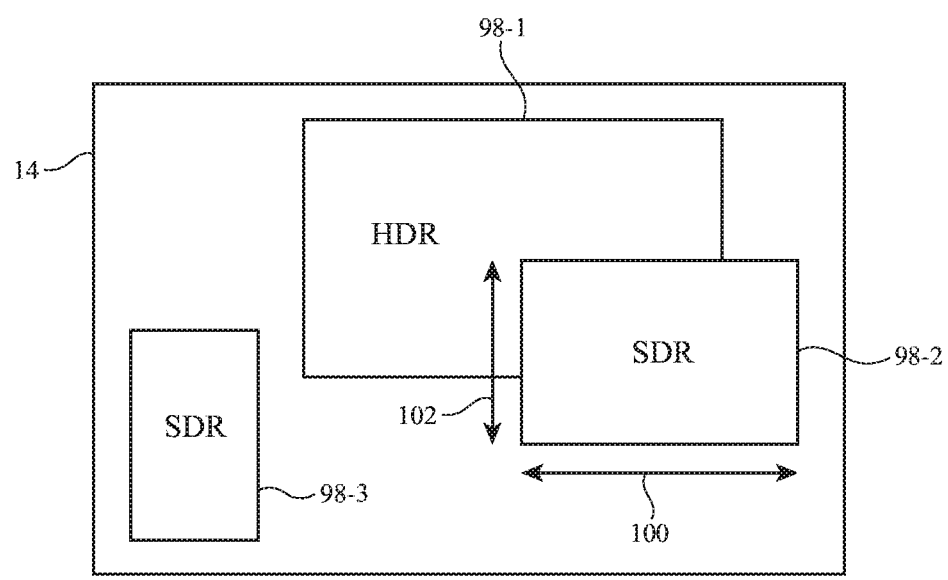
FIG. 8 is a top view of an illustrative display with multiple windows of high dynamic range content and standard dynamic range content in accordance with an embodiment.

Per-window information 96 may also be provided to tone mapping engine 24. As previously discussed, one or more windows with SDR content and/or one or more windows with HDR content may be simultaneously displayed on display 14. In the example of FIG. 8, the display is used to show an HDR window 98-1, a first SDR window 98-2, and a second SDR window 98-3. Each window may have a corresponding width 100 and height 102. The width and height of each window (e.g., the size 96-1 in FIG. 7) may be used by tone mapping engine 24. For example, larger windows may be more likely to be viewed by the user and this may be accounted for by the tone mapping engine. The example in FIG. 8 of the windows being rectangular is merely illustrative. The windows may have any desired shape, size, and location.

The location of each window (e.g., the relative location on the display) may also be used by the tone mapping engine. For example, windows that are more central on the display (e.g., closer to a geometric center of the display) may be more likely to viewed by the user and this may be accounted for by the tone mapping engine. Because the per-window information may be used to inform where a viewer is looking on the display (e.g., a user's point of gaze), the per-window information (such as the window size and location) may sometimes also be referred to as point of gaze information.

There are many scenarios in which both SDR content and HDR content may be simultaneously displayed as shown in FIG. 8. As an example, a high dynamic range video may be displayed in a background area and picture-in-picture window standard dynamic range content (still images, video, and/or text and graphics) may overlap a portion of the background area. In another illustrative arrangement, a split-view window approach may be used in which high dynamic range content on one side of display 14 (e.g., the left side) is simultaneously displayed with standard dynamic range content on another side of display 14 (e.g., the right side). Slide-over content arrangements in which an area of standard dynamic range content slides over and progressively covers increasing portions of a high dynamic range area on display 14 or in which high dynamic range content slides over standard dynamic range content on display 14 may also be used. In some arrangements, standard dynamic range text such as text for editing buttons, subtitles, and closed captioning information may be overlaid on high dynamic range content. In yet another possible arrangement, high dynamic range content may overlap (e.g., be superimposed on) standard dynamic range image content from a passthrough camera or other SDR augmented reality content.

When standard dynamic range and high dynamic range areas are displayed simultaneously, the black level, reference white level, and specular white level can for each of these areas can be independently adjusted to ensure that the content on display 14 is presented satisfactorily (e.g., to avoid situations in which some of the content appears washed out or too bright compared to other content, to avoid situations in which white standard dynamic range text appears grayish rather than white when adjacent to content with bright specular highlights, etc.). For example, tone mapping engine 24 can detect when mixed standard dynamic range and high dynamic range is being presented (or is about to be presented) on display 14 and can generate corresponding standard dynamic range and high dynamic range tone mapping parameters that balance the appearances of the standard dynamic range and high dynamic range areas to avoid undesired visual effects while taking into account factors such as ambient light conditions, content statistics, user brightness settings, and display characteristics.

Returning to FIG. 7, the content type 96-3 of each window may be used by the tone mapping engine in addition to size information 96-1 and location information 96-2. The content type may include content statistics for the particular window. For example, the average luminance values of the pixels in the particular window or histogram information for the luminance values of the pixels in the particular window may be used to provide information on the type of content in the window. This type of information may identify if the window is displaying predominantly white or predominantly black content, for example. In another example, the content type may be provided in the form of metadata associated with the window (e.g., content category information such as, for example, "movie", "live sports", "e-mail", "web browser," etc.). Other content statistics such as information on content quality such as bit depth, dynamic range of image input data (e.g., minimum, mean, and maximum value), compression type and amount, data rate, noise level, metadata-specified quality factors, and other content quality metrics can also be gathered for each window and provided to tone mapping engine 24. Content type 96-3 may also identify the state of the particular window. For example, the window may be identified as a full-screen window, a picture-in-picture window, etc.

During operation, content generators 84 may produce content to be displayed on display 14. Content generators 84 may, for example, render game images in a video game, may retrieve stored movie data and provide corresponding video frames to be displayed on display 14, may produce still image frames associated with an operating system function or application program, and/or may produce other content for displaying on display 14. The content from content generators 84 may include standard dynamic range content and/or high dynamic range content.

Tone mapping engine 24 may use information on ambient conditions 76, brightness settings information 78, content statistics 80, display characteristics 82, point of gaze information 90, power source and consumption information 92, and/or per-window information 96 to determine how original content values should be mapped to display content values (e.g., to determine how to map content luminance values to display luminance values in accordance with mapping curves of the type described in connection with FIGS. 2-5). To ensure that content is displayed appropriately on display 14, tone mapping engine 24 can provide content generators 84 with tone mapping parameters to use in performing luminance mapping operations and/or can implement luminance mapping for content generators 84.

In some configurations, content generators 84 may be capable of adjusting content luminance values internally. In these situations, tone mapping engine 24 can supply content generators 84 with tone mapping parameters such as a black level, reference white level, specular white level, skin tone level, and/or the slope or gamma of the mapping curve. The tone mapping parameters inform content generators 84 of an appropriate mapping curve to use in supplying content 86 to display 14.

In other configurations, content generators 84 may not be capable of adjusting content luminance values internally or it may otherwise be desirable to implement tone mapping separately from the tone mapping functions of content generators 84. In these circumstances, content 86 from content generator 84 may be provided to tone-mapping engine 24. Tone mapping engine 24 may then use remapping engine 94 to apply a desired content-luminance-to-display luminance mapping (e.g., a mapping defined by the tone mapping parameters BL, RW, and SW) to ensure that the luminance of content 86 is adjusted appropriately (e.g., so that content 86 is remapped in accordance with a desired content-luminance-to-display luminance mapping to produce corresponding remapped content 88 for displaying on display 14). In mapping the luminance values of content 86 to the new (remapped) luminance values of content 88, the content-luminance-to-display luminance mapping that is used by engine 24 may follow pre-defined parameters (e.g., default) tone mapping parameters or may use the same tone mapping parameters that engine 24 would provide to a content generator that is capable of adjusting content luminance values by applying the desired mapping internally.

Remapping engine 94 may also be used to update tone mapping parameters based on a detected change in the user's point of gaze. For example, remapping engine 94 may receive content 86 from content generators that has already been mapped using the tone mapping parameters (sometimes referred to as initial tone mapping parameters) provided to the content generators 84. However, due to the detected change in the user's point of gaze, remapping engine 94 may update the content and output remapped content 88 that accounts for the change in the user's point of gaze. In scenarios in which content generators 84 are not capable of adjusting content luminance values internally or it is otherwise desirable to implement tone mapping separately from the tone mapping functions of content generators 84, tone mapping engine 24 may use remapping engine 94 to apply a desired content-luminance-to-display luminance mapping to content 86. Remapping engine 94 may account for point of gaze information when determining the content-luminance-to-display luminance mapping to apply to content 86.

Content may be adjusted during point of gaze transitions between standard dynamic range content and high dynamic range content by dynamically adjusting one or more tone mapping parameter values. For example, if user's point of gaze switches between high dynamic range content with a high specular white level and standard dynamic range content with a low specular white level, the specular white level of the standard dynamic range content can be temporarily increased to mitigate the user detecting the reduced brightness of the standard dynamic range content. One or more tone-mapping parameters may be adjusted in response to a point of gaze transitioning between HDR and SDR content. The tone-mapping parameter may slowly transition between two values in response to a change in point of gaze. In another example, the tone-mapping parameter may be gradually changed from an initial value to an updated value and then gradually changed back to (or towards) the initial value in response to a change in point of gaze.

Figure 9:
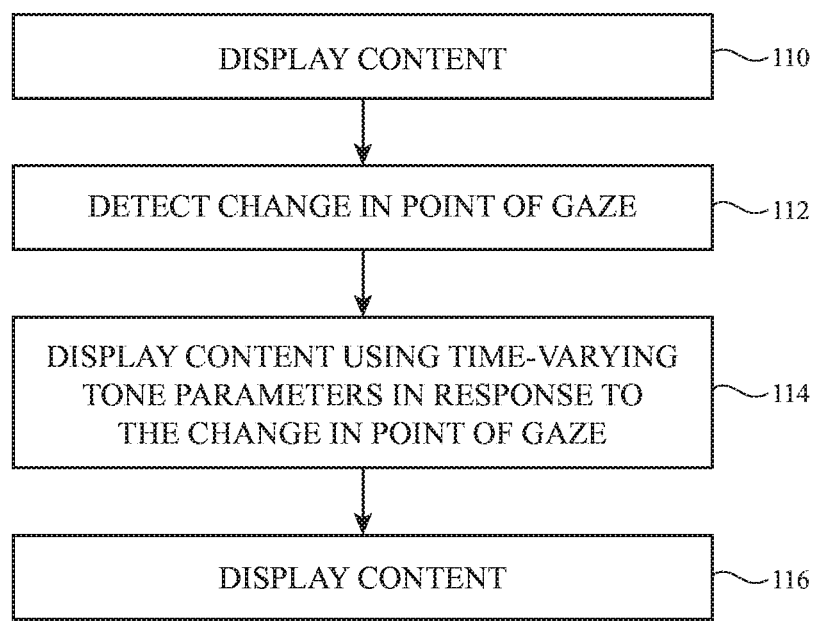
FIG. 9 is a flow chart of illustrative operations associated with displaying content in response to a point of gaze switching between standard dynamic range content and high dynamic range content in accordance with an embodiment.

FIG. 9 is a flow chart of illustrative operations involved in modifying tone map parameters in response to a change in a point of gaze of a viewer between standard dynamic range content and high dynamic range content.

During the operations of block 110, one or more content generators (e.g., high dynamic range content generator 20 or standard dynamic range content generator 22) may generate content to be displayed on display 14. Tone mapping engine 24 may generate tone mapping parameters that are used either by the content generators or by the tone mapping engine itself to map content luminance values to display luminance values that are ultimately provided to display 14.

In response to detecting the presence of content for display 14 that includes one or more areas of SDR content and one or more HDR content areas, tone mapping engine 24 may, during the operations of block 110, select appropriate mapping curves for the respective SDR and HDR areas. If the HDR areas include HDR content that is compliant with different HDR standards, different sets of mapping curves may be used for the different HDR areas. For example, a first HDR area may be used to display HDR content compliant with a first HDR standard using a first HDR mapping curve defined by first tone mapping parameters and a second HDR area may be used to display HDR content compliant with a second HDR standard using a second mapping curve defined by second tone mapping parameters that are different than the first tone mapping parameters. The mapping curves that are selected may be selected based on ambient conditions 76 (e.g., brighter mappings of darker pixel levels may be desired to overcome glare in the SDR region and/or the HDR region), may be selected based on brightness settings 78 (e.g., a user-selected brightness setting), may be based on content statistics 80, may be based on display characteristics 82 (e.g., information on the bit depth of display 14, etc.), may be based on point of gaze information 90 (e.g., information from a gaze-tracker, active window information, cursor location information, etc.), may be based on power source and consumption information 92, and/or may be based on per-window information (e.g. information on the size of each window, the location of each window, the type of content in each window, etc.).

The selection of the respective SDR and HDR mapping curves may also be coordinated during the operations of block 110 so that the SDR and HDR content (e.g., HDR content of one or more types) are visually appealing when displayed together. This may involve compromises such as presenting HDR content using a lower specular white level than would normally be used for displaying HDR content in the absence of SDR content and presenting SDR content using higher specular white levels than would normally be used for displaying SDR content in the absence of HDR content. When appropriate tone mapping curves have been selected, associated tone mapping parameters (e.g., a first set of tone mapping parameters for SDR content and a second set of tone mapping parameters for HDR content) may be generated and provided to content generators 20 and 22.

During the operations of block 112, a change in the point of gaze of the viewer may be detected based on point of gaze information. The change in the point of gaze may be detected based on point of gaze information such as gaze-tracker information 90-1, active window information 90-2, and/or cursor location information 90-3. The change in the point of gaze in block 112 may be a change in the point of gaze between standard dynamic range content (e.g., an SDR window or background) and high dynamic range content (e.g., an HDR window or content). The change in the point of gaze between HDR content (which may be relatively bright) and SDR content (which may be dim relative to the HDR content) may require mitigating action to make the display more visually appearing to the viewer. Block 114 shows an example of such mitigating action.

During the operations of block 114, the HDR and/or SDR content displayed on the display may be displayed using time-variable tone parameters in response to the change in the point of gaze. Any desired tone mapping parameters may be time-varying in response to the change in point of gaze (e.g., black level, reference white level, specular white level, skin tone level, and/or the slope or gamma of the mapping curve). There are many possible schemes that may be used to vary the tone mapping parameters over time in response to a change in point of gaze, as will be discussed in connection with FIGS. 10-13. During the operations of block 116, after the time-varying tone mapping parameters have stabilized, content may again be displayed similar to as in block 110.

FIGS. 10-13 are graphs showing how tone map parameters may vary over time in response to a change in point of gaze. FIGS. 10-13 show an example where a point of gaze changes from HDR content to SDR content. It should be understood that any tone mapping parameter may be varied in response to the change in point of gaze. However, maximum display brightness (e.g., specular white level) will be examined in FIGS. 10-13 as an example.

Figure 10:
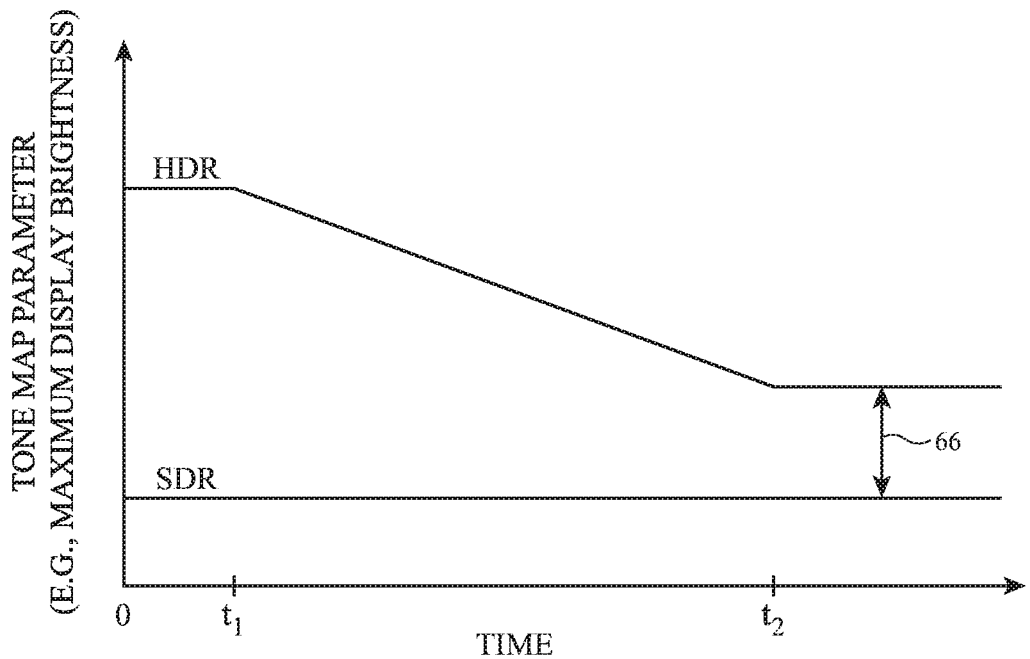
FIGS. 10-13 are graphs of illustrative responses for a tone mapping parameter that may be varied over time in response to a point of gaze switching between standard dynamic range content and high dynamic range content in accordance with an embodiment.

In FIG. 10, the point of gaze changes at $t_1$. When the point of gaze changes from HDR content to SDR content, the observed brightness for the user drops (due to the difference in maximum brightness between the HDR and SDR content). In the example of FIG. 10, the brightness of the SDR content remains constant even after the detected change in point of gaze. However, the HDR content begins to gradually decline at $t_1$ in response to the detected change in point of gaze. Decreasing the maximum brightness of the high dynamic range content may mitigate the potentially distracting effect of having bright HDR content on the display while the user is viewing less bright SDR content. The maximum brightness is decreased gradually between $t_1$ and $t_2$ to avoid a detectable change for the viewer. Ultimately, at $t_2$, the difference between the HDR and SDR maximum brightness (e.g., headroom 66) is reduced relative to before $t_1$.

Figure 11:
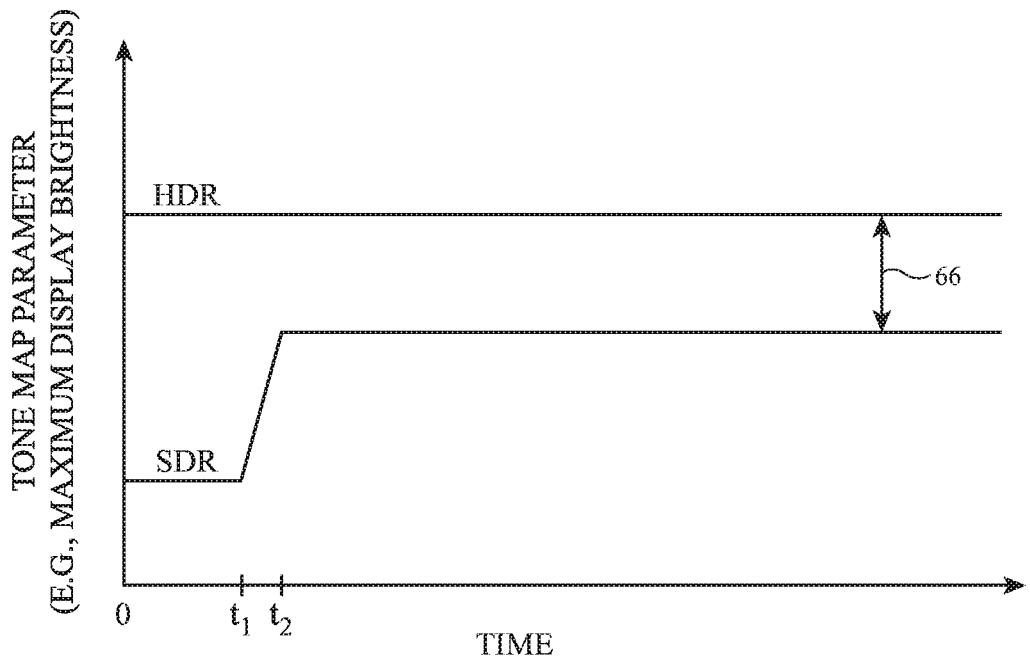

FIG. 11 shows another example where the point of gaze changes from HDR content to SDR content at $t_1$. In response, the maximum brightness of the SDR content is increased between $t_1$ and $t_2$. Making the SDR content brighter in this way makes the SDR content appear less dim to the viewer when the viewer has just switched their point of gaze towards the SDR content.

Figure 12:
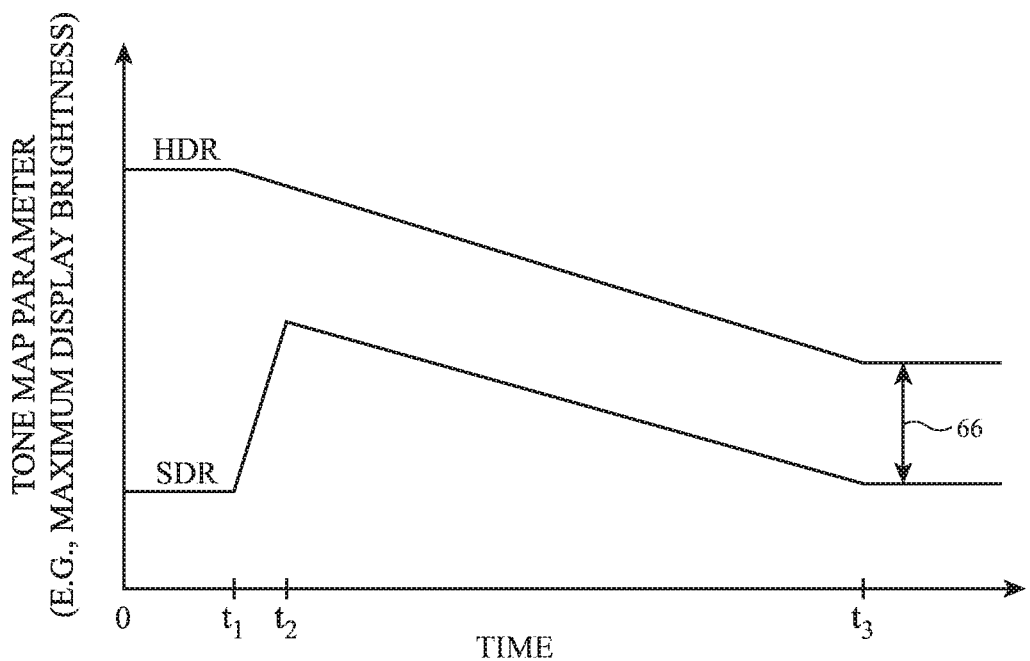

FIG. 12 shows another option for varying tone mapping parameters over time in response to a change in point of gaze. When the point of gaze changes from HDR content to SDR content at $t_1$, the observed brightness for the user drops (due to the difference in maximum brightness between the HDR and SDR content). To avoid the SDR content appearing too dim when initially viewed by the viewer, the SDR brightness may be increased between $t_1$ and $t_2$. Therefore, since the viewer is adapted to bright HDR content, the SDR content will not appear unappealingly dim. However, after initially brightening the SDR content between $t_1$ and $t_2$, the maximum brightness of the SDR content may then be gradually reduced between $t_2$ and $t_3$. Simultaneously, the brightness of the HDR content may gradually reduce between $t_1$ and $t_3$. Ultimately, at $t_3$, the difference between the HDR and SDR maximum brightness (e.g., headroom 66) is reduced. This effectively produces an end state where the SDR content is displayed with a desired brightness while avoiding any initial shock caused by switching point of gaze from the HDR content to the SDR content. The HDR content is dimmed so as to not appear undesirably bright while the viewer is looking at the SDR content.

Figure 13:
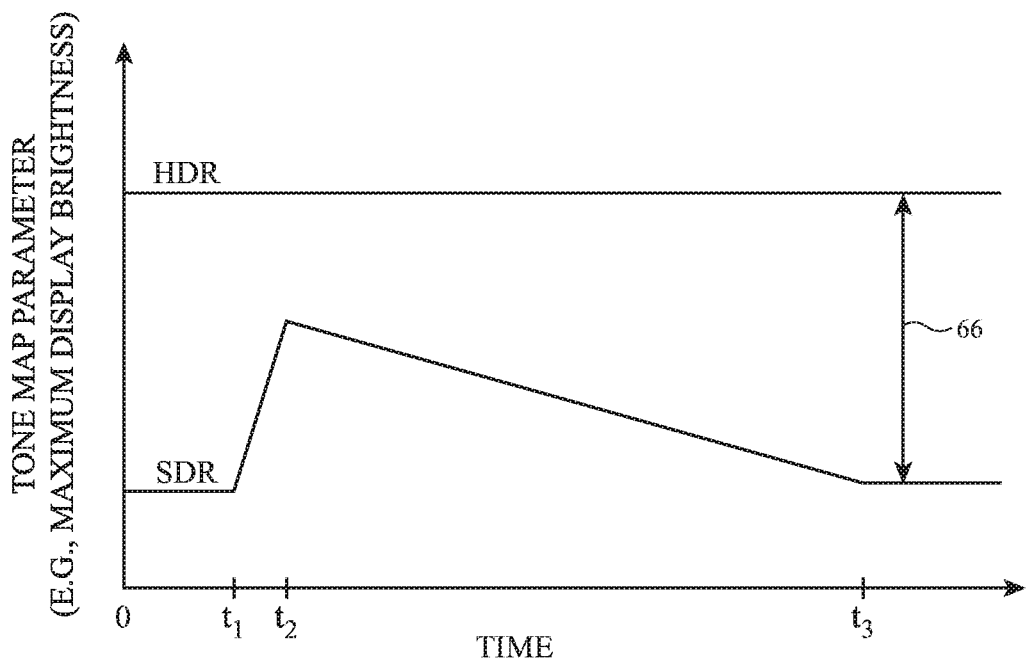

The example of the headroom between the SDR and HDR content being reduced in response to the change in point of gaze is merely illustrative. FIG. 13 shows an alternate time-varying tone mapping parameter scheme where the SDR maximum brightness follows a similar pattern as in FIG. 12 but the HDR maximum brightness remains constant. Similar to as in FIG. 12, initially raising the SDR brightness prevents the SDR content from appearing too dim when initially viewed by the viewer. However, because the HDR brightness remains constant, the headroom 66 between the HDR and SDR content may return to its original magnitude (e.g., the magnitude before $t_1$) at $t_3$ after the SDR brightness has been reduced back to its original level. Various hybrids of these schemes may also be used. For example, in FIGS. 12 and 13, the SDR brightness may initially increase then decrease to a brightness level that is reduced relative to the brightness at $t_2$ but still brighter than the initial (pre-$t_1$) brightness level.

The graphs of FIGS. 10-13 show examples where a point of gaze switches from HDR content to SDR content. However, it should be understood that these concepts may instead be applied to the opposite scenario in which a point of gaze switches from SDR content to HDR content. For example, in response to a change in point of gaze from SDR content to HDR content, the HDR brightness may remain constant and the SDR brightness may gradually be raised (e.g., the opposite of FIG. 10). In response to a change in point of gaze from SDR content to HDR content, the SDR brightness may remain constant and the HDR brightness may be lowered (e.g., the opposite of FIG. 11). In response to a change in point of gaze from SDR content to HDR content, the HDR brightness may initially be dropped then gradually increase (e.g., back to its original level) while the SDR brightness is gradually increased (e.g., the opposite of FIG. 12). In response to a change in point of gaze from SDR content to HDR content, the HDR brightness may initially be dropped then gradually increase (e.g., back to its original level) while the SDR brightness remains constant (e.g., the opposite of FIG. 13).

The time parameters (e.g., $t_2$ and $t_3$) in FIGS. 10-13 may be any desired lengths of time. For example, $t_2$ in FIG. 10 may be greater than 1 second, greater than 5 seconds, greater than 10 seconds, greater than 20 seconds, greater than 30 seconds, greater than 45 seconds, greater than 60 seconds, less than 60 seconds, between 1 and 60 seconds, etc. In FIG. 11, $t_2$ may be greater than 0.1 second, greater than 1 second, greater than 2 seconds, greater than 5 seconds, less than 5 seconds, between 0.1 second and 5 seconds, etc. In FIGS. 12 and 13, $t_2$ may be greater than 0.1 second, greater than 1 second, greater than 2 seconds, greater than 5 seconds, less than 5 seconds, between 0.1 second and 5 seconds, etc. In FIGS. 12 and 13, $t_3$ may be greater than 1 second, greater than 5 seconds, greater than 10 seconds, greater than 20 seconds, greater than 30 seconds, greater than 45 seconds, greater than 60 seconds, less than 60 seconds, between 1 and 60 seconds, etc.

Any desired tone mapping parameters may be time-varying according to the principles of FIGS. 10-13 (e.g., black level, reference white level, specular white level, skin tone level, and/or the slope or gamma of the mapping curve).

The concepts of FIGS. 1-13 have been primarily described in relation to a single display in an electronic device. However, in some applications, an electronic device may have more than one display. In this type of device, information from both displays may be used to optimize the appearance of SDR and HDR content across the displays. For example, information from both displays may be used to determine tone mapping parameters for the displays. Time varying tone parameters (as discussed in step 114 of FIG. 9, for example) may be applied to one or more of the displays in response to a change in point of gaze.

In another possible application, multiple electronic devices with respective displays may be operated together in an integrated system. For example, a desktop computer may have two or more monitors (e.g., in a side-by-side arrangement). Again, in this type of scenario, information from both displays may be used to optimize the appearance of SDR and HDR content across the displays. For example, information from both displays may be used to determine tone mapping parameters for the displays. Time varying tone parameters (as discussed in step 114 of FIG. 9, for example) may be applied to one or more of the displays in response to a change in point of gaze.

In general, determining optimal tone mapping schemes for various conditions (e.g., different brightness levels, display settings, point of gaze transitions, etc.) may involve user studies, modeling, and/or laboratory testing. These tone mapping schemes can then be implemented by tone mapping engine 24. The tone mapping schemes may also optionally be adjusted by a user of the electronic device. For example, the user may have access to settings of the electronic device. In the settings of the electronic device, the user may have the option to select a given transition method (e.g., one of the transition methods of FIGS. 10-13), may have the option to adjust certain parameters (e.g., maximum headroom, minimum headroom, transition speed, etc.), may turn off the point of gaze adjustments entirely, etc. In general, any variable relied upon for displaying the HDR and SDR content may optionally be adjusted by the user.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
a gaze-tracker that obtains point of gaze information;
a display; and
control circuitry configured to:
generate first content having a first dynamic range and a first maximum brightness level;
generate second content having a second dynamic range that is larger than the first dynamic range and a second maximum brightness level that is brighter than the first maximum brightness level;
while at a first point of gaze determined using the point of gaze information, simultaneously display the first and second content using the first and second maximum brightness levels, wherein a difference between the first and second maximum brightness levels has a first magnitude while at the first point of gaze; and
in response to detecting a change from the first point of gaze to a second point of gaze based on the point of gaze information, change the difference between the first and second maximum brightness levels from a first magnitude to a second magnitude that is different than the first magnitude.

2. The electronic device defined in claim 1, wherein the control circuitry is configured to:
provide initial first and second maximum brightness levels for the first and second content based at least on ambient light conditions; and
in response to detecting the change from the first point of gaze to the second point of gaze based on the point of gaze information, modifying the initial first and second maximum brightness levels to determine the first and second maximum brightness levels that are used to simultaneously display the first and second content.

3. The electronic device defined in claim 2, wherein the first point of gaze overlaps the first content and the second point of gaze overlaps the second content.

4. The electronic device defined in claim 2, wherein the first point of gaze overlaps the second content and the second point of gaze overlaps the first content.

5. The electronic device defined in claim 2, wherein providing the initial first and second maximum brightness levels for the first and second content based at least on the ambient light conditions comprises providing the initial first and second maximum brightness levels for the first and second content based at least on the ambient light conditions, at least one brightness setting, display characteristics associated with the display, and content statistics.

6. The electronic device defined in claim 1, wherein the first point of gaze overlaps the first content and the second point of gaze overlaps the second content.

7. The electronic device defined in claim 1, wherein the first point of gaze overlaps the second content and the second point of gaze overlaps the first content.

8. The electronic device defined in claim 1, wherein the control circuitry is configured to, in response to detecting the change from the first point of gaze to the second point of gaze:
increase the first maximum brightness level from a third magnitude to a fourth magnitude then decrease the first maximum brightness level from the fourth magnitude back towards the third magnitude.

9. The electronic device defined in claim 8, wherein the control circuitry is configured to, in response to detecting the change from the first point of gaze to the second point of gaze:
decrease the second maximum brightness level from a fifth magnitude to a sixth magnitude.

10. The electronic device defined in claim 1, wherein changing the difference between the first and second maximum brightness levels from the first magnitude to the second magnitude that is different than the first magnitude comprises changing the first maximum brightness level.

11. The electronic device defined in claim 1, wherein changing the difference between the first and second maximum brightness levels from the first magnitude to the second magnitude that is different than the first magnitude comprises changing the second maximum brightness level.

12. The electronic device defined in claim 1, wherein:
after changing the difference between the first and second maximum brightness levels from the first magnitude to the second magnitude, the second maximum brightness level remains brighter than the first maximum brightness level.

13. An electronic device, comprising:
a display; and
control circuitry configured to:
generate first content having a first dynamic range;
generate second content having a second dynamic range that is different than the first dynamic range;
simultaneously display the first and second content; and
in response to received point of gaze information indicating a change from a first point of gaze on the first content to a second point of gaze on the second content, gradually change a difference between magnitudes of maximum brightness levels of the first and second content.

14. The electronic device defined in claim 13, wherein the point of gaze information includes information from a gaze-tracker.

15. The electronic device defined in claim 13, wherein the first content is contained in a first window on the display, wherein the second content is contained in a second window on the display, and wherein the point of gaze information includes active window information.

16. The electronic device defined in claim 15, wherein gradually changing the difference between magnitudes of maximum brightness levels of the first and second content comprises gradually changing a maximum brightness level of at least one of the first and second content based on a respective size and location of each of the first and second windows.

17. The electronic device defined in claim 13, wherein the point of gaze information includes cursor location information.

18. The electronic device defined in claim 13, further comprising:
an input-output device, wherein the point of gaze information includes information from the input-output device.

19. The electronic device defined in claim 13, wherein the second dynamic range is greater than the first dynamic range both before and after gradually changing the difference between magnitudes of maximum brightness levels of the first and second content.

20. An electronic device, comprising:
a display; and
control circuitry configured to:
generate first content having a first dynamic range;
generate second content having a second dynamic range that is less than the first dynamic range;
simultaneously display the first and second content using respective tone mapping parameters; and
in response to received point of gaze information indicating a change in point of gaze from the first content to the second content, change a tone mapping parameter for a selected one of the first content and the second content from a first magnitude at a first time to a second magnitude at a second time subsequent to the first time, wherein the tone mapping parameter has at least one intermediate magnitude between the first magnitude and second magnitude at a time between the first and second times and wherein, after changing the tone mapping parameter, the second dynamic range remains less than the first dynamic range.

* * * * *